Patented Aug. 16, 1949

2,479,040

UNITED STATES PATENT OFFICE 2,479,040

PROCESS FOR OBTAINING PROTEIN FROM OIL SEED RESIDUES

Glenn Davidson, Aurora, Ill.

No Drawing. Application April 12, 1945,
Serial No. 588,073

15 Claims. (Cl. 260—112)

The commercial practice of extracting protein from oil seed residues, such as soy beans, has been characterized by low yield of protein as compared with the total protein content of the raw material, and particularly difficult and expensive separations, and, in fact, the only method therefor which has been of large commercial application has been centrifuging, which required especially large machines of high power consumption per unit of material treated. Where a large proportion of the protein content thus fails of extraction, such procedure is unduly wasteful and expensive. In accordance with the present invention, a most thorough utilization of the material may be had, however, and with avoidance of such undesirable operations as centrifuging and the like. Other objects and advantages of the invention will appear from the following description.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

Oil seed residues, that is, the material left from the removal of oil from oil seed such as soy beans, peanuts, flaxseed, castor beans, tung nuts, corn germ, etc., constitutes raw material which may be worked-up in accordance with the present invention.

For extracting isolated vegetable protein from material of this character heretofore, the operation has been commonly divided into five distinct steps as follows:

1. Solution of the protein in aqueous alkali.
2. Clarification of this solution.
3. Precipitation of the protein from this alkaline solution by reduction of the pH, i. e., the addition of acid.
4. Dewatering of the precipitated curd to a reasonable moisture content.
5. Drying of the curd.

Due at least in part to the fact that the protein as dissolved into the aqueous alkaline solution "deflocculates" or acts as a dispersing agent for the hemicellulosic gums and cell fragment material to form a slime, capable of quickly "blinding" every known commercial filtering medium, filtration processes generally have been inoperative. In addition, the filtrate foams so excessively under vacuum as to make a filter of the Oliver or Dorrco (internal drum) type worthless for this reason alone. The result is that up to the present, only high power consuming centrifuging has been employed. Even with centrifuging, it is impossible to get a product sufficiently free of cell fragment material to permit spinning into filaments, i. e. protein rayon, except at prohibitively slow rates of flow, through the centrifuge.

The successful filtration of aqueous extracts of protein containing residues involves the formation of a filter bed of the water-swollen cellular material of the residue while simultaneously extracting the protein therefrom, and auto-filtering the protein extract through the cellular material from which it has been extracted. In its preferred form, the filter bed of water-swollen cellular material will minimize the segregation of the hemicellulosic gums and cell fragment material into a distinct layer of appreciable depth, capable of slowing the rate of flow. Also to be avoided is any wedging or excessive packing of the filter bed, resulting from the swelling of the cellular material during the formation of the bed. In order to form a successful filter bed, several precautions must be carefully observed. Foremost among these precautions are the mechanics of the formation of the bed, the selection of the protein containing residue for its mechanical condition and its non-protein constituents and the selection of a proper aqueous protein solvent.

If the oil seed residue, after removal of the oil, for instance in the form of solvent-extracted flakes such as soy bean flakes (e. g. extractor flakes all passing a 4-mesh screen and containing 20 per cent passing a 40-mesh screen and 5 per cent an 80-mesh screen) is stirred into an aqueous alkaline solution in a container provided with a controleld drain in the bottom and is allowed to settle, the heavy or fibrous particles settle or stratify at the bottom of the container and thereabove are progressively smaller particles, finally the hemicellulosic germs and cell fragment material, and at the top clear supernatant liquid. If 10 parts of alkaline solution to 1 part of residue is used, as is a convenient proportion, although it may be varied considerably each way, the settled residue will occupy approximately the lower two-thirds of the container. As alkaline solvent, about 5 parts of borax or trisodium phosphate per 100 lbs. of dry residue is very satisfactory, although this proportion may be decreased by several parts, or may be increased, up to 20 per cent based on weight of the flakes. Other alkaline agents which may be used are alkali phosphates, sulphites, etc. Carbonates are much less desirable, on account of the disturbance occasioned by the disengaged carbon dioxide gas in the stage of acidulating. Caustic alkalies, such as caustic soda or potash, and even ammonia, are undesirable at this stage, being too active in swelling and gelatinizing the gum. The alkali may be omitted entirely and the procedure used to make water extracts. With the material disseminated in the alkaline solution and the fibrous layer formed at the bottom, as above referred to, the outlet of the container is now opened so as to allow the liquid to drain slowly and filter through the fibrous layer which is formed at the bottom. It will be understood that suitable support, as cloth, glass fiber, or the like, on a grill, is provided slightly above the bottom of the container, to prevent escape of the fibrous material. The liquid filtering through the mass of residue is well clarified and contains a substantial portion of the protein of the original material, and this works suitably where the total depth does not exceed about three feet. For operation with greater depths of liquid, further modifications are desirable. The reason for this is that (1) the particles of the residue become broken up somewhat by the mechanical stirring and result in an increased percentage of fines, and (2) a considerable portion of the protein is dissolved during the initial stirring, and this tends to deflocculate or disperse the fine material and keep it in suspension, and this forms an upper gummy layer above the lower fibrous or largest particles of the residue which tends to clog and slow the filtration. Accordingly, it is preferred to carry on the separation in a container which is of hopper shape or wider above than below, its wall converging to a narrow outlet end below. The dry residue may be charged into such container, and the aqueous alkaline solution be then run in at the bottom at a rate not materially churning up the mass, and after the liquid is all run in, the valve is closed until ready for draining. With such upwardly expanding section of the container, the cellular material swells and expands laterally and upwardly, without wedging, as may occur in a container with vertical sides, and the fines are entrapped in the residue to such an extent as to essentially eliminate the top gummy layer. The bottom valve is now opened, and the liquid is auto-filtered through the filter bed of water-swollen cellular material. A wash of further alkaline solution, or water, may be run in, if desired, and also be drained.

Auto-filtration is commercially practicable only with protein residues of the solvent extracted flake type and not with meal made from expeller or hydraulic press cake. All of the reasons for this are obscure but perhaps a description of the two types of material will be helpful.

In the case of solvent extracted soy bean flakes, for example, the coarsely cracked beans are passed between very heavy duty rolls prior to the removal of the oil by the solvent. Elaborate precautions are taken to have the beans at an optimum moisture content and temperature, to produce the largest possible flakes at a minimum thickness and a minimum amount of fines. Precautions are also taken to cause each bean particle to pass between the rolls individually so that each resulting flake is an individual entity and not compacted with another.

Typically the flakes coming from the flaking rolls may be 0.5″ in diameter and 0.010″–0.015″ in thickness. As these flakes pass through the equipment for the removal of the oil by solvent, naturally they are broken up somewhat so that the largest flakes in the final solvent extracted product commonly are not more than 0.25″ in diameter and average, perhaps, 0.125″ in diameter.

The oil content of solvent extracted flakes is ordinarily about 0.75%.

On the contrary, in the expeller and hydraulic press processes for removing the oil, the individual bean particles are compacted together into comparatively massive units which require grinding before any protein extraction with aqueous solvents can be undertaken.

When expeller or hydraulic press cake is ground substantially equi-dimensional particles are obtained. Now, the 0.015″ thickness of solvent extracted flakes probably represents about the maximum distance through which efficient extraction of the protein can be obtained by the necessary diffusion processes. Accordingly, in order to get equal efficiency of protein extraction from the individual particles, the expeller or hydraulic press cake must be ground until the particles approximate 0.015″ in diameter.

It is obvious that if two solvent extracted flakes, each 0.015″ in thickness and 0.125″ in diameter are placed face-to-face, a continuous passageway 0.125″ in length exists between them. Likewise it is obvious that if two equi-dimensional particles 0.015″ in diameter, ground from expeller or hydraulic press cake, are placed together, the length of the continuous passageway between is 0.015″. Thus, it is seen that the average length of the continuous difficultly blockadable passageways through a filter bed of solvent extracted flakes can easily be several times as great as through a filter bed or ground expeller or hydraulic press cake.

The expeller and hydraulic press cakes contain 5.0%–7.0% oil and somewhat larger amounts of lecithin and lecithin-like substances than the solvent extracted flakes. Now soaps, which may be formed by the interaction of the alkaline protein extractant and the oil, as well as the lecithin, are extremely good dispersing agents or "deflocculators" for the hemicellulosic gums and cell fragment material. Accordingly, the hemicellulosic gums and cell fragment material of ground expeller or hydraulic press cake disintegrate into slime capable of blocking the filter bed to a much greater extent than is the case with solvent extracted flakes.

Instead of initially stirring the residue into the alkaline solution or running the alkaline solution into the charge of dry material, a particularly desirable procedure is to charge the aqueous alkaline solution into the tank, of either form described, and then sprinkle the dry residue over the top of the solution at a rate not faster than it will wet out, sink into the liquid and settle. After the residue is all in and well settled, the outlet in the bottom of the tank is opened as described above, and the liquid is auto-filtered through the filter bed of water-swollen cellular material.

In all cases the treatment with the aqueous alkaline solution is thus on a prompt schedule which, without much agitation, provides for dissolving protein and simultaneously forming a filter bed of water-swollen cellular material and avoiding the production and the segregation of "fines" into a gummy layer capable of retarding flow, and the liquid being auto-filtered through such bed of cellular material.

With the effective extraction of protein thus attained, however, the filtrate or obtained solution containing dissolved protein as coming through the filter bed, still leaves considerable protein in the filter residue. This is accordingly further treated as described below, but the filtrate which has been obtained is acidulated to a pH to effect precipitation, viz. about 4.5, and the protein is thrown out as a curd. This is washed and is dried.

The filter residue above referred to is now subjected to treatment with another aqueous alkaline solution or is digested, with dilute caustic soda solution or other alkali, as, for example, 0.4 per cent, or 4 per cent NaOH calculated on the dry residue basis. The concentration of this extracting solution may be varied somewhat above or below this amount. The mixture of liquid and suspended residue is then passed over a fine perforated surface, such as a 200-mesh (or finer) screen. Preferably, this screen is set on an incline of between 5° and 40° (preferably between 15° and 30°) to the horizontal, and the material is fed so as to flow down the slope of the screen, being distributed by suitable means, as a pipe or trough with a series of perforations, or a dam with notches, or by a spray, etc., and the screen should be vibrated in its own plane and at right angles to the direction of flow of the material. The amplitude of vibration may be about 1/8" to 1/4", and a satisfactory frequency is 600 per minute, but this may be varied somewhat higher or lower. A zone of separation is correspondingly provided, in which the suspension is subjected to sufficient vibration and supply of liquid to wash the very fine particles of hemicellulose through the perforations, while the fibrous material or cellulose is rejected by the screen. The liquid obtained is a solution of further extracted protein and with very fine suspended gelatinized gum or hemicellulose particles. On now acidulating to a pH of approximately 4.5, the dissolved protein and the hemicellulose are precipitated out together. This precipitate is washed and is dried.

The protein yield from the first stage treatment with the alkaline solution is about 25 lbs. per hundred pounds of the original residue treated. The solids obtained on the first separation amount to around 45 lbs. per hundred of the original material, this containing about 40 per cent protein. With the further digestion with alkaline solution as described, an additional yield of about 32 lbs. per hundred of the original material is obtained, this being made up of protein intimately mixed with 40–50 per cent of hemicellulose. The first fraction of protein obtained is suitable for any fine usage, nutritional or industrial. The second precipitate of mixed protein and hemicellulose is particularly well suited for certain paper coating or adhesive usages. The final solid residue from the separation of the last solution is predominantly cellulose fiber, with screened-out particles of hemicellulose or gum, and some residual protein, and is suitable for stock feed mixtures.

The acid used in both precipitations may be any suitable mineral acid or acetic acid, usually sulphuric acid, and in concentration about 6.0 per cent $H_2SO_4$.

Other modes of applying the principle of the invention may be employed, change being made as regards the detail described, provided the features stated in any of the following claims, or the equivalent of such, be employed.

I therefore particularly point out and distinctly claim as my invention:

1. In a process of working up oil seed residue, incorporating with an aqueous alkaline salt solution solvent-extracted flake oil seed residue, allowing the gummy component of the residue to swell in a zone divergently widening above while the fibrous component stratifies convergently below, filtering the solution through the fibrous stratum, digesting the filter solids in an aqueous caustic alkali solution, passing the resultant dispersion to a separating done and permitting escape of liquid but rejecting particles of fiber while agitating and differentially washing smaller hemicellulose particles through with the liquid, and acidulating the liquid and precipitating protein and hemicellulose together.

2. In a process of working up oil seed residue, sprinkling solvent-extracted flake oil seed flake residue particles on an aqueous alkaline salt solution at a rate not faster than they wet and sink in the liquid, and dissolving the protein and swelling the gummy component of the material and stratifying the fibrous portion below, filtering the solution through the fibrous stratum, digesting the filter solids in an aqueous caustic alkali solution, passing the resultant dispersion to a separating zone and permitting escape of liquid but rejecting particles of fiber while agitating and differentially washing smaller hemicellulose particles through with the liquid, and acidulating the liquid and precipitating protein and hemicellulose together.

3. In a process of working up oil seed residue, incorporating the flake oil seed flake residue particles with an aqueous alkaline salt solution, allowing the gummy component of the residue to swell and the fibrous component to stratify below, filtering the solution through the fibrous stratum, digesting the filter solids in an aqueous caustic alkali solution, passing the resultant dispersion to a separating zone and permitting escape of liquid but rejecting particles of fiber while agitating and differentially washing smaller hemicellulose particles through with the liquid, and acidulating the liquid and precipitating protein and hemicellulose together.

4. In a process of working up oil seed residue, sprinkling the flake oil seed flake residue particles on an aqueous non-acid protein solvent at a rate not faster than they wet and sink in the liquid, and dissolving the protein and swelling the gummy component of the material in a zone divergently widening above while stratifying the fibrous portion convergently below, filtering the solution through the converged fibrous stratum, digesting the filter solids in an aqueous caustic alkali solution, passing the resultant dispersion to a separating zone and permitting escape of liquid but rejecting particles of fiber while agitating and differentially washing smaller hemicellulose particles through with the liquid, and acidulating the liquid and precipitating protein and hemicellulose together.

5. In a process of obtaining protein from oil seed residue, charging solvent-extracted flake oil seed flake residue into a zone divergently wider above, introducing an aqueous non-acid protein solvent up through the bottom of the material without substantial disturbance thereof, and dissolving protein therefrom and by such solvent swelling the gummy component of the material and stratifying the fibrous portion convergently 6. In a process of obtaining protein from oil seed residue, sprinkling the flake oil seed flake residue particles on an aqueous non-acid protein solvent at a rate not faster than they wet and sink in the liquid, and dissolving the protein and by such solvent swelling the gummy component of the material in a zone divergently widening above while preparing a filtering bed in situ by stratifying the fibrous portion convergently below, and filtering the solution through the converged fibrous stratum filtering bed.

7. In a process of obtaining protein from oil seed residue, sprinkling the flake oil seed flake residue particles on an aqueous non-acid protein solvent at a rate not faster than they wet and sink in the liquid, and dissolving the protein and by such solvent swelling the gummy component of the material while preparing a filtering bed in situ by stratifying the fibrous portion below, and filtering the solution through the fibrous stratum filtering bed.

8. In a process of obtaining protein from oil seed residue, mixing solvent-extracted flake oil seed flake residue with an aqueous non-acid protein solvent and dissolving the protein and preparing a filtering bed in situ by settling the undissolved portion most compactly at the bottom and thence successively less compactly thereabove by bedding the material convergingly narrowest at the bottom and progressively widening above and finally filtering the solution through the fibrous filtering bed.

9. In a process of obtaining protein from oil seed residue, disseminating in an aqueous non-acid protein solvent solvent-extracted flake oil seed flake residue particles containing not over 20 per cent which pass 40 mesh, and by such solvent respectively swelling the gummy portion in suspension and dissolving the protein and preparing a filtering bed in situ by stratifying the fibrous portion below, and finally filtering the solution through such filtering bed.

10. In a process of obtaining protein from oil seed residue, mixing the flake residue with an aqueous alkaline salt solution, swelling the gummy component therein and dissolving protein, preparing a filtering bed in situ by stratifying the fibrous portion in a progressively narrowing zone below, and finally filtering the solution through the progressively narrowing fibrous zone.

11. In a process of obtaining protein from oil seed residue, sprinkling solvent-extracted oil seed flakes into an aqueous solution of borax, preparing a filtering bed in situ by allowing the oil seed material to settle, and draining the resultant protein solution through the settled material.

12. In a process of obtaining protein from oil seed residue, sprinkling solvent-extracted oil seed flakes into an aqueous alkaline salt solution, preparing a filtering bed in situ by allowing the oil seed material to settle, and draining the resultant protein solution through the settled material.

13. In a process of obtaining protein from oilseed residue, sprinkling solvent-extracted flake oilseed residue on an aqueous solution of borax at a rate not faster than it will wet and sink in the borax solution, preparing a filter in situ by allowing the residue to sink and form a filter bed, draining the resulting solution of protein in aqueous borax through such filter bed, and acidulating the resultant filtrate to precipitate the protein therefrom.

14. In a process of obtaining protein from flake oilseed residue, sprinkling solvent-extracted oilseed residue particles containing not over 20 per cent which pass 40 mesh, on an aqueous alkaline solution at a rate not faster than to wet and sink, preparing a filter in situ by allowing the residue to sink and form a filter bed, draining the resulting solution of protein through such filter bed, and acidulating the resultant filtrate to precipitate the protein therefrom.

15. In a process of obtaining protein from flake oilseed residue, sprinkling solvent-extracted oilseed residue on an aqueous solution of borax at a rate not faster than to wet and sink in the borax solution, said solution containing borax in effective amount up to 20 per cent of the dry weight of the oilseed residue, preparing a filter in situ by allowing the residue to sink and form a filter bed, draining the resulting solution of protein in aqueous borax through such filter bed, and acidulating the resultant filtrate to precipitate the protein therefrom.

GLENN DAVIDSON.

REFERENCES CITED

The following references are of record in the file of this patent:

UNITED STATES PATENTS

| Number | Name | Date |
| --- | --- | --- |
| 263,958 | Renwick | Sept. 5, 1882 |
| 1,794,105 | David et al. | Feb. 24, 1931 |
| 2,278,670 | Rauer | Apr. 7, 1942 |
| 2,296,464 | Brown | Sept. 22, 1942 |
| 2,331,619 | Morse | Oct. 12, 1943 |
| 2,370,138 | Bonotto | Feb. 27, 1945 |

Certificate of Correction

Patent No. 2,479,040 August 16, 1949

GLENN DAVIDSON

It is hereby certified that errors appear in the printed specification of the above numbered patent requiring correction as follows:

Column 6, line 14, for the word "done" read *zone*; lines 21, 37, 51, 69, and column 7, lines 5, 16, 27, and 39, after "seed" strike out "flake";

and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*